Patented Oct. 25, 1938

2,134,388

UNITED STATES PATENT OFFICE 2,134,388

METHOD OF MAKING PHENOLIC ESTERS

Oscar A. Cherry, Chicago, Ill., assignor to The Glidden Company, Cleveland, Ohio, a corporation of Ohio No Drawing. Application April 2, 1935, Serial No. 14,376. Renewed March 26, 1938

10 Claims. (Cl. 260—479)

This application is a continuation in part of my applications Serial #749,991, filed October 25, 1934, and Serial #11,843, filed March 19, 1935.

This invention relates to the esterification of phenolic hydroxyl groups with high-boiling, relatively unreactive organic acids, and has particular reference to a new and novel method for conducting such esterifications whereby such esters are obtained economically and successfully. In particular, it refers to a method of esterifying phenolic hydroxyls with mixed anhydrides of high and low-boiling acids, under such conditions that low-boiling acid is formed and distilled off, leaving an ester of the high-boiling acid.

In the production of phenyl esters, various methods have been used. With the active low molecular weight acids such as acetic acid, the esters have been prepared by reacting the anhydride directly with the phenol, in the presence of a condensing agent such as caustic soda. The ester is then separated from the reaction mixture by any available method.

As the molecular weight of the acids increases, their reactivity decreases. In the case of the straight chain saturated acids, this is particularly true; and the anhydrides of acids with more than 7 carbon atoms (caprylic acid and higher) will not esterify phenols by a simple direct reaction under normal operation conditions. It is necessary, in such cases, either to react the phenols with the acid chloride, or to react them with the acids in the presence of reagents which will form the acid chlorides in situ (e. g. phosphorous oxychloride, thionyl chloride). In either case, hydrochloric acid is evolved; this acid is extremely corrosive, and must be separated from the reaction mass. Furthermore, the acid chlorides, and the carrying agents, are rather expensive; and the commercial preparation of these esters is therefore not feasible by this method.

It has been proposed to esterify phenols at extremely high temperatures with acid anhydrides; but in addition to the difficulties encountered in the reaction, it is extremely difficult to separate the esters from the free acids liberated.

In my application Serial #749,991, filed October 15, 1934, I have disclosed the fact that a phenolic resin containing free phenolic hydroxyl groups may be esterified by mixing such a phenolic resin with a difficultly reactive acid, and a low-boiling organic acid anhydride, such as acetic anhydride, and heating the mixture in such a manner that the free low-boiling acid formed is distilled off, while the anhydride and high-boiling acid are kept in the reaction zone. In my copending application Serial #11,843, filed March 19, 1935, I have disclosed that this reaction is generic for phenols.

I have now discovered that similar esters may be prepared by the action on a phenol of a mixed anhydride of a high-boiling and a low-boiling carboxylic acid; and that this reaction is likewise generic for all phenolic hydroxyl groups whether in free phenols or in phenolic resins.

By a high-boiling carboxylic acid is meant in the foregoing and in the claims an acid of this class which boils at above 200° centigrade, at atmospheric pressure. Examples of such acids are rosin, linseed oil and other oil fatty acids, stearic acid, and benzoic acid. This is, of course, not a complete list of the acids I have found to be of value.

By a low-boiling carboxylic acid in the foregoing and in the claims is meant an acid of this class which boils at below 190° centigrade at atmospheric pressure. Acetic acid is the acid of this class which has been found to have the greatest value, although propionic and chloroacetic acid are likewise available.

It has beeen found convenient to prepare the mixed anhydrides by distilling low boiling carboxylic acid from a mixture of a low-boiling acid anhydride and a high-boiling carboxylic acid.

Preferably one molecular weight of the desired high-boiling carboxylic acid and one molecular weight of the desired low-boiling acid anhydride are placed in the vessel and one molecular weight of the low-boiling acid from which the anhydride is derived is distilled off while the escape of substantial amounts of the low-boiling anhydride is prevented. This latter may be accomplished by the use of a suitable distilling column, the design of which is well known in the arts.

To the mixed anhydride so obtained is added the phenol or phenolic resin the ester of which is desired and low-boiling acid is again distilled from the mixture or solution. This is continued until the esterification is complete. Of course, it is obvious that sufficient phenol or phenol resin must be added to react with the mixed anhydride or a product having a high acid number will result. If an excess of a phenol is used, of course, free phenol will remain. This can be removed by vacuum distillation, or otherwise. If an excess of phenolic resin is used, a partial ester will result. By partial ester is meant one which contains in its composition unreacted or unesterified phenolic hydroxyl groups.

It is important in the preliminary distillation which results in the mixed anhydrides that a quantity of low-boiling acid not greatly exceeding one mol for each mol of low-boiling anhydride be distilled. If too much is distilled some excess anhydride of the high-boiling carboxylic acid will result. Since these anhydrides do not react readily or satisfactorily on account of the fact that by reaction they leave free acid in the mass their formation should be avoided.

Specific examples will make clear the mode of operation, thus permiting those skilled in the art to clearly understand the invention. It is to be understood that these examples are to be considered in a purely illustrative sense.

Example 1

In a vessel equipped with a suitable distilling column are added 239 parts of hydrogenated fish oil fatty acids and 90.5 parts of 95% acetic anhydride. The solution is heated until 44 parts of acetic acid have been distilled, the temperature at the top of the still head preferably not exceeding 120° centigrade. To the mixed anhydride are added 100 grams of a cresylic acid fraction boiling between 208° centigrade and 215° centigrade. The distillation is then continued until substantially all of the acetic acid which can result from the hydration of the acetic anhydride originally used has been eliminated from the reaction flask. The product is then preferably subjected to reduced pressure to eliminate traces of acetic acid and uncombined phenols. In the final stages of the distillation at atmospheric pressure it is desirable to raise the temperature of the reactants to approximately 280-290° centigrade.

Example 2

A mixture of 344 parts of rosin having an acid number of 163 and 110 parts of 92-95% acetic anhydride are heated as above described until 63 parts of acetic acid have been distilled. To the mixed anhydride are added 105 parts of phenolic resin previously prepared from 100 parts of phenol and 72 parts of 40% formaldehyde in the presence of an acid catalyst and by known methods.

Upon heating a homogeneous solution is formed. The heating is continued until substantially all of the remainder of the acetic acid derivable from the acetic anhydride has been distilled. The product is substantially neutral, and soluble in oils.

It is advisable for most purposes to purify the ester resin from traces of free acetic acid. This may be easily done by subjecting the resin to a reduced pressure while still hot. Any other suitable means may be used to accomplish the same end.

In Example 2 the amount of mixed anhydride used is sufficient to substantially completely esterify all the hydroxyl groups of the phenolic resin. Were a larger amount to be used the final product would contain uncombined high-boiling carboxylic acid in the form of its anhydride. When this is desirable for any reason such excess may be used without departing from the spirit of this invention. When it is desired to esterify only a portion of the phenolic hydroxyls, a correspondingly smaller quantity of the mixed anhydride may be used. A partial ester will be formed in this case.

It is apparent for the greatest economy of materials that the low-boiling anhydride should be used to an amount substantially equal molecularly to the high-boiling carboxylic acid. If an excess of high carboxylic acid is used the phenyl or phenol resin ester will contain free high-boiling acid. When this is not harmful or when it may be desired such an excess may be used without departing from the spirit of this invention.

A convenient and economical method of preparing the mixed anhydrides has been here described. It is to be understood that other methods for preparing these starting materials may be used.

Mixtures of high-boiling carboxylic acid instead of one high-boiling carboxylic acid may be used to produce mixed esters. In the claims the term 'high-boiling carboxylic acid" is to be construed broadly enough to include mixtures, or individual acids which boil above 200° centigrade.

In the claims the term "phenolic body" is used generically for substances containing free phenolic hydroxyl groups.

While I have shown but one example of a phenol, and one of a phenolic resin, and but one anhydride, it is obvious that other low-boiling acid anhydrides, high-boiling acids and phenolic bodies may be used, without departnig from the spirit of my invention.

In the claims, the term "heat treating" is defined as heating under such conditions that the low-boiling acid derived from the anhydride is removed from the reaction, while the original reactants are retained therein.

No claim is made herein for the products resulting from the practice of this process. Such products are claimed in my co-pending application, Serial #749,991, above referred to.

I claim:

1. The process of esterifying a phenolic body containing free hydroxyl groups, which comprises heating it, with a mixed anhydride of a carboxylic acid boiling below 190° C. and a carboxylic acid boiling above 200° C., to a temperature above the boiling point of the lower boiling acid.

2. The process of claim 1, in which the mixed anhydride is sufficient to completely esterify all free phenolic hydroxyl groups with the carboxylic acid boiling above 200° C.

3. The process of esterifying phenolic hydroxyls which comprises heating a phenolic body having free hydroxyl groups with a mixed anhydride of a carboxylic acid boiling below 190° C. and a carboxylic acid boiling above 200° C., to a temperature above the boiling point of the lower-boiling acid, and distilling off the lower-boiling acid as formed.

4. The process of claim 3, in which the mixed anhydride is sufficient to completely esterify all free phenolic hydroxyl groups with the carboxylic acid boiling above 200° C.

5. The process of esterifying a phenolic body containing free hydroxyl groups which comprises heating it with a mixed anhydride of acetic acid and a carboxylic acid boiling above 200° to a temperature above the boiling point of acetic acid.

6. The process of claim 5 in which the mixed anhydride is sufficient to completely esterify all free phenolic hydroxyl groups with the carboxylic acid boiling above 200° C.

7. The process of esterifying a phenolic body containing free hydroxyl groups which comprises heating it with a mixed anhydride of acetic acid and a carboxylic acid boiling above 200° to a temperature above the boiling point of acetic acid;

and distilling of the acetic acid from the reaction mixture as formed.

8. The process of claim 7 in which the mixed anhydride is sufficient to completely esterify all free phenolic hydroxyl groups with the carboxylic acid boiling above 200° C.

9. The process of esterifying a phenolic body which comprises heating it with a mixed anhydride of acetic and oil fatty acids to a temperature above the boiling point of acetic acid, distilling off acetic acid from the reaction mixture as formed.

10. The process of esterifying a phenolic body which comprises heating it with a mixed anhydride of acetic and oil fatty acids to a temperature above the boiling point of acetic acid, distilling off acetic acid from the reaction mixture as formed, the mixed anhydride being present in such quantity that the high-boiling portion thereof is sufficient to completely esterify all free phenolic hydroxyl groups.

OSCAR A. CHERRY.